Aug. 11, 1925.  
R. J. FEJA  
1,549,408  
COUPLING FASTENER  
Filed Aug. 11, 1924

Witnesses:

Inventor:  
Robert J. Feja  
By Joshua R. H. Potts  
His Attorney.

Patented Aug. 11, 1925.

1,549,408

UNITED STATES PATENT OFFICE.

ROBERT J. FEJA, OF CHICAGO, ILLINOIS.

COUPLING FASTENER.

Application filed August 11, 1924. Serial No. 731,324.

*To all whom it may concern:*

Be it known that I, ROBERT J. FEJA, a citizen of the United States, and a resident of the city of Chicago, county of Cook, and State of Illinois, have invented certain new and useful Improvements in Coupling Fasteners, of which the following is a specification.

My invention relates to a coupling-fastener, and the main object of my invention is the provision of a device of this class which may be highly efficient in use and economical in manufacture. Another object of my present invention is the provision of a device of the character described which may be employed in a great variety of ways as an instrumentality through the medium of which to connect one part or chain of parts with another part or chain of parts.

Objects and advantages, other than those specified, will appear hereinafter.

My invention consists in the disposition of parts and in the combinations and arrangements thereof as hereinafter described and claimed.

For a full understanding of my invention, reference is to be had to the accompanying drawing forming a material part of this specification, and in which, Fig. 1 represents a top plan view of my coupling-fastener, which is here shown in closed position.

Figure 1:
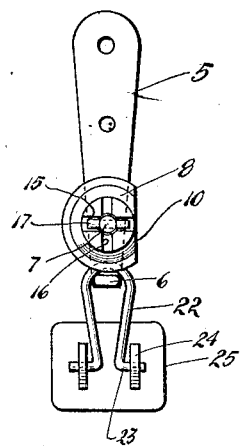
Figure 2:
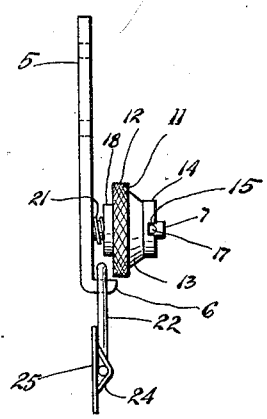
Fig. 2 represents an edge view thereof.
Figure 3:
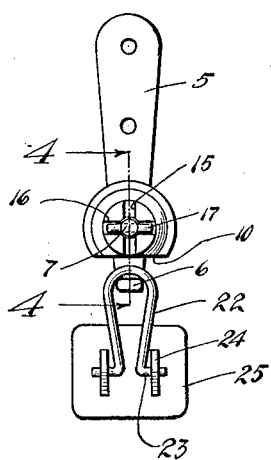
Fig. 3 is a view similar to that shown in Fig. 1, but with the device in open position.
Figure 4:
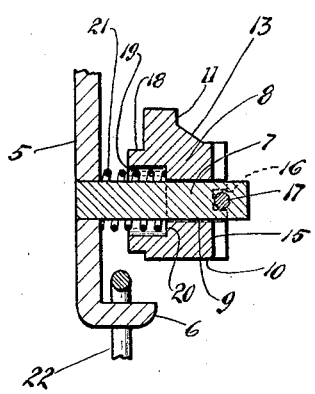
Fig. 4 represents a sectional view, taken in a line 4—4 of Fig. 3.

In referring with particularity to the accompanying drawing, it will be seen that, by way of illustration, I have shown my improvements in connection with a member 5 which is to be coupled up with another member. Member 5, herein shown as a bar, may, in practice, represent an entire element or a portion of an element or a member of a chain of elements.

In the exemplification shown, the coupling-bar 5 has an end 6 which is laterally bent at right angles for the purpose of serving as a hook or catch on which may be engaged the element or part to be coupled with the coupling-bar 5. At a point distant from the laterally bent portion 6 and on the same side of the bar therewith, there is fixed to the bar by riveting or otherwise, a pivot stud 7. For rotatable mounting on the pivot stud 7, I provide a fastener body 8 having an axial bore 9. Exteriorly this fastener body is formed with a flat region or face 10, the remainder of the periphery consisting of a circularly formed flange 11 which is knurled at 12 in order readily to be grasped firmly by the fingers for the purpose of turning the fastener body on the pivot stud and also for depressing it as will presently appear. On the outer side of the flange 11, the fastener body is formed with a region 13 which is axially inclined and merges into a boss 14. On the end or face of the boss 14 there are provided intersecting recesses 15 and 16, each adapted to receive therein a pin or key 17 which is passed through the pivot stud 7 in a transverse direction near the outer end thereof.

At its inner end the fastener body 8 is formed exteriorly with a projecting hub portion 18, and interiorly with a cavity 19, which represents a concentric enlargement of the bore 9. Coiled around the pivot stud 7 and confined between the coupling-bar 5 and the annular wall 20 constituting the end of the cavity 19, is a coiled spring 21 which normally urges the fastener body into butting engagement with the pin 17. The relation of the fastener body 8 to the laterally bent portion 6 is such that when the flat region 10 confronts the laterally bent portion 6 a coupling element as 22 may be engaged over the said laterally bent portion 6; and that when the fastener body is turned so that the circular flange 11 then confronts the laterally bent portion 6, the coupling member 22 will be held against removal since the flange 11 is of such dimension that it closes the space interval through which the coupling member 22 is applied or removed between the fastener body 8 and the laterally bent portion 6. It will be observed in this connection that the pin 17 is fixed in the pivot stud 7 in parallel relation to the outwardly bent portion 6, so that when the said pin 17 is seated in the recess 16 of the fastener body, the coupling element 22 may be either engaged with or disengaged from the laterally bent portion 6; further, that when the pin 17 is seated in the recess 15 of the fastener body, the last mentioned will be locked in position with the flange 11 closing the space interval so that the coupling member 22 cannot be disengaged from the laterally bent portion 6. Obviously, in order to turn the fastener body 8, it is only necessary to depress the same sufficiently to clear the pin 17.

In the accompanying drawing the coupling member 22 is shown as consisting of a resilient loop formed with angular extremities 23 which are pivotally engaged in eyes formed from the lugs 24 struck out from the plate 25, which may constitute a single element or a portion of an element or a member of a chain of elements, the said plate 25 as well as the coupling member 22 being herein shown only for the purpose of illustrating how parts may be coupled together.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A coupling member having a coupling projection and a pivot stud, in combination with a fastener body rotatably mounted on the pivot stud and having a portion adapted to co-act with said projection to retain an article thereon, and means for locking said fastener body to said pivot stud.

2. A coupling member having in combination a coupling projection and a fastener body mounted for rotation in relation to said projection, a segmental flange on the fastener body adapted to co-act with said projection to retain an article thereon, and a hub extension to space said flange from the face of the coupling member for the reception of an article therebetween.

3. In combination, a pair of coupling members, one having a projection and the other having a portion engaging over said projection, a pivot stud on the face of the main member, a fastener body rotatable on said stud and having a radially extending portion adapted to retain the second named member on said projection, and means for locking said fastener body to said stud.

4. In combination, a pair of coupling members, a coupling projection on one member receiving the other member, a pivot stud on the first named member, a fastener body rotatable on said pivot stud and having a radially extending portion adapted to co-act with said coupling projection in locking the second named member thereon, means for locking the fastener body to its pivot stud, and resilient means urging the fastener body into locking position.

5. The combination with a coupling member having a portion adapted to be engaged with a coupling element, of a pivot stud carried by the coupling member in relation to the projecting portion, a fastener body having both axial and turning fit on the pivot stud and having portions formed thereon adapted to open and to close the space interval leading to and from the region whereat coupling engagement is affected with the projecting portion, and means for locking said fastener member to said pivot stud.

6. A coupling fastener including a coupling member having a coupling portion and a pivot stud, a spring member on said pivot stud, a fastener body having a hub portion partially enveloping said spring member, and a segmental flange projecting from said fastener body and adapted to co-act with said coupling portion to retain an article thereon.

7. The combination of two coupling members formed with co-operative coupling portions, and a spring urged fastener body movably mounted on one coupling member and adapted to co-operate with the coupling portion thereof to receive at one place the coupling portion of the second coupling member and to refuse to receive at another place the coupling portion of the second coupling member.

8. A coupling-fastener including a coupling member having a laterally projecting coupling portion, a pivot stud fixed on the coupling member in relation to the coupling portion, a fastener body rotatably mounted on the pivot stud and having portions formed thereon for opening and closing the way for coupling engagement with the coupling member, a spring coiled on the pivot stud and acting on the fastener body, and means on the pivot stud for limiting the outward movement of the fastener body.

9. A coupling-fastener including a coupling member having a projecting coupling portion, a pivot stud fixed on the coupling member in relation to the coupling portion, a depressible fastener body movably mounted on the pivot stud and formed with peripheral portions adapted one to close and the other to open the way for coupling engagement with the coupling member, and means in connection with the pivot stud and the fastener body for locking the last mentioned in open position and in closed position.

In testimony whereof I have signed my name to this specification in the presence of two subscribing witnesses.

ROBERT J. FEJA.

Witnesses:
FREDA C. APPLETON,
JOSHUA R. H. POTTS.